(12) United States Patent
DelFranco et al.

(10) Patent No.: US 11,120,379 B2
(45) Date of Patent: *Sep. 14, 2021

(54) MAINFRAME WORKFLOW MANAGER SYSTEM AND METHOD

(71) Applicant: JPMorgan Chase Bank, N.A., New York, NY (US)

(72) Inventors: Michael DelFranco, Edison, NJ (US); Brian S. Elliott, Worthington, OH (US); John Consiglio, Staten Island, NY (US); Simon Higgins, Hampshire (GB); Charles Andrew Wilkins, Dorset (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 50 days.

This patent is subject to a terminal disclaimer.

(21) Appl. No.: 16/397,649

(22) Filed: Apr. 29, 2019

(65) Prior Publication Data
US 2019/0251488 A1 Aug. 15, 2019

Related U.S. Application Data

(63) Continuation of application No. 14/532,057, filed on Nov. 4, 2014, now Pat. No. 10,282,690.

(51) Int. Cl.
*G06Q 10/06* (2012.01)
*G06F 16/951* (2019.01)
(Continued)

(52) U.S. Cl.
CPC ....... *G06Q 10/0633* (2013.01); *G06F 3/0484* (2013.01); *G06F 16/951* (2019.01); *G06F 16/972* (2019.01)

(58) Field of Classification Search
None
See application file for complete search history.

(56) References Cited

U.S. PATENT DOCUMENTS

| 2005/0080765 A1* | 4/2005 | Dettinger | G06F 16/24549 |
| 2007/0208602 A1* | 9/2007 | Nocera | G06Q 30/06 705/7.26 |

(Continued)

OTHER PUBLICATIONS

Lin, Liu and Hong, Modeling User's Mobile App Privacy Preferences. Restoring Usability in a Sea of Permission Settings. (Year: 2014).*

*Primary Examiner* — Akosua Kyereme-Tuah
(74) *Attorney, Agent, or Firm* — Greenblum & Bernstein, P.L.C.

(57) ABSTRACT

A mainframe workflow creation method creates and manages managing workflow tasks in a mainframe workflow management system. The method includes activating a workflow creation engine in the mainframe workflow management system by a user of a computing device using a web dashboard, communicating with the mainframe workflow management system over a communication network, and creating workflow tasks corresponding to a mainframe workflow. The method also includes associating the workflow tasks with a mainframe workflow process, and selecting a target mainframe computing system from a plurality of target mainframe computing systems for execution of the mainframe workflow process. The method further includes transmitting the mainframe workflow process to the selected target mainframe computing system over the communication network, and executing the mainframe workflow process, including plurality of workflow tasks, by the selected target mainframe computing system.

17 Claims, 10 Drawing Sheets

(51) Int. Cl.
*G06F 16/958* (2019.01)
*G06F 3/0484* (2013.01)

(56) References Cited

U.S. PATENT DOCUMENTS

| | | | |
|---|---|---|---|
| 2011/0055834 A1* | 3/2011 | Meda | G06F 11/3466 718/101 |
| 2011/0225565 A1* | 9/2011 | van Velzen | G06Q 10/06 717/114 |
| 2013/0110520 A1* | 5/2013 | Cheyer | H04M 1/7243 704/275 |
| 2014/0201747 A1* | 7/2014 | Pattnaik | G06F 11/3089 718/101 |
| 2014/0337071 A1* | 11/2014 | Stiffler | G06Q 10/06311 705/7.13 |
| 2015/0222625 A1* | 8/2015 | Ford | H04L 65/403 726/7 |
| 2017/0124163 A1* | 5/2017 | Bender | G06F 16/254 |

* cited by examiner

| Task ID | Description | Status | Predecessors | Ready Time | Start Date/Time | End Date/Time | Result | Type | Target System | JCL |
|---|---|---|---|---|---|---|---|---|---|---|
| 0100 | Deploy XYZ on SYSPLEX "A" | Completed | None | On Output Queue | 02/01/2014 10:00:00 | 02/01/2014 10:15:00 | Success | Job | Sysplex "A" | ZOS.JCL(Deploy) |
| 0200 | Deploy XYZ on SYSPLEX "B" | Completed | None | On Output Queue | 02/01/2014 10:00:00 | 02/01/2014 10:15:03 | Success | Job | Sysplex "B" | ZOS.JCL(Deploy) |
| 0300 | Deploy XYZ on SYSPLEX "C" | Completed | None | On Output Queue | 02/01/2014 10:00:00 | 02/01/2014 10:15:05 | Success | Job | Sysplex "C" | ZOS.JCL(Deploy) |
| 0400 | Deploy XYZ on SYSPLEX "D" | Job is Executing | None | | 02/01/2014 10:00:00 | | | Job | Sysplex "D" | ZOS.JCL(Deploy) |
| 0500 | Validate XYZ on SYSPLEX "A" | Completed | 0100 | On Output Queue | 02/01/2014 10:15:10 | 02/01/2014 10:20:10 | Success | Job | Sysplex "A" | ZOS.JCL(Validate) |
| 0600 | Validate XYZ on SYSPLEX "B" | Completed | 0200 | On Output Queue | 02/01/2014 10:15:13 | 02/01/2014 10:20:13 | Success | Job | Sysplex "B" | ZOS.JCL(Validate) |
| 0700 | Validate XYZ on SYSPLEX "C" | Job is Executing | 0300 | Dependency on 0300 Met | 02/01/2014 10:15:15 | | | Job | Sysplex "C" | ZOS.JCL(Validate) |
| 0800 | Validate XYZ on SYSPLEX "D" | Pending | 0400 | Dependency Wait on 0400 | | | | Job | Sysplex "D" | ZOS.JCL(Validate) |

FIG 6

MAINFRAME WORKFLOW MANAGER SYSTEM AND METHOD

CROSS REFERENCE TO RELATED APPLICATIONS

This is a continuation application of U.S. patent application Ser. No. 14/532,057, filed Nov. 4, 2014. The entire disclosure of the above-identified application, including the specification, drawings, and claims, is incorporated herein by reference in its entirety.

TECHNICAL FIELD

Embodiments of the present invention are directed to a system and method for a mainframe workflow manager that allows authorized users to create, manage, and execute a coordinated series of inter-related workflow tasks designed to achieve the goals of a larger mainframe workflow.

BACKGROUND OF THE INVENTION

Workflow management systems are designed to automate business processes by coordinating and controlling the flow of work and information between participants. Workflow management systems automate entire work processes, rather than isolated tasks. Mainframe workflow management systems automate mainframe-based workflows. Successful workflow management systems result in significant cycle time reductions, cost reductions, improved accuracy, greater control, and greater worker satisfaction. However, existing mainframe workflow management systems are unsuccessful. The most important reasons for failure include complex and poor change management, dependence on manual intervention, inconsistent results. Legacy processes are complex, manual, and not conducive to being used by other than the most experienced technical staff, without assistance. Further, it can get too cumbersome to account for and visually represent several routing iterations, status changes, and the effects of external events or operations.

Furthermore, the prior workflow management systems do not provide mechanisms to ensure that work assignments are concluded without falling through the cracks. Another disadvantage with prior art systems is that users who design the workflow are not enabled to iteratively refine the process until an optimal workflow is achieved. Typically, a workflow has to be worked out at the outset and provided to the workflow management system. To this end, it is very difficult, if not impossible, to detect errors in the workflow rules defined by such systems.

Thus, there is a need for a mainframe workflow management system and method that enables users to efficiently and easily develop and execute existing and complex repeatable mainframe workflows that can be iteratively refined and revised. There is a further need for a mainframe workflow management system and method that enables users to efficiently import and execute previously saved workflows. A system and method is needed that would help avoid the inconsistent results inherent with processes containing many manual steps or points of human intervention.

BRIEF SUMMARY OF THE INVENTION

In accordance with exemplary embodiments of the present invention, there is provided a computer implemented web based unified workflow management system for reducing complexity and building repeatable mainframe workflows by creating and managing workflow tasks associated with at least one mainframe workflow. In one aspect of the invention, the system implements a computer processor accessing at least one storage medium and comprises a workflow creation engine for creating at least one mainframe workflow task associated with the at least one mainframe workflow, the at least one mainframe workflow task including at least one execution target destination, at least one mainframe process, and at least one success criteria. The system may also provide a web dashboard that displays the details and results of the mainframe workflow tasks associated with a mainframe workflow. A user may modify the properties of the mainframe workflow tasks using the web dashboard. Further, the web dashboard may allow a user to monitor and control the mainframe workflow, and its associated tasks. The system may further comprise a workflow task dependency manager for creating global task dependencies between tasks associated with the at least one mainframe workflow.

In a further aspect of the invention, a computer implemented mainframe workflow creation method is provided for reducing complexity and building repeatable mainframe workflows by creating and managing workflow tasks associated with at least one mainframe workflow using a unified workflow management system implementing a computer processor accessing at least one storage medium. The method creates at least one workflow task corresponding to the at least one mainframe workflow using a workflow creation engine. The method may associate the workflow task with an execution target destination, a mainframe process, and a success criteria. The method may further define inter-task dependencies between one or more workflow tasks associated with a mainframe workflow. The method may display the details of a mainframe workflow, and its associated tasks at a web dashboard. A user may then perform various operations on the mainframe workflow including, but not limited to, view the workflow and/or workflow tasks, modify the workflow and/or workflow tasks, delete the workflow and/or workflow tasks, execute the workflow and/or workflow tasks, save the workflow and/or workflow tasks, search for a workflow and/or workflow tasks, etc.

BRIEF DESCRIPTION OF THE DRAWINGS

The present invention is described in detail below with reference to the attached drawings figures, wherein:

FIG. 5A is a user interface illustrating a Web Dashboard of a Mainframe Workflow Management System in accordance with an embodiment of the invention;

FIG. 5B is a user interface illustrating a Web Dashboard of a Mainframe Workflow Management System in accordance with an embodiment of the invention;

FIG. 5C is a user interface illustrating a Web Dashboard of a Mainframe Workflow Management System in accordance with an embodiment of the invention;

FIG. 6 is a user interface illustrating a Web Dashboard of a Mainframe Workflow Management System in accordance with an embodiment of the invention;

DETAILED DESCRIPTION OF PREFERRED EMBODIMENTS

Embodiments of the present invention are directed to a system and method for a Mainframe Workflow Manager that provides authorized users the ability to create, manage, and execute a coordinated series of inter-related workflow tasks designed to achieve the goals of a larger mainframe workflow. A workflow may be a coordinated series of inter-related workflow tasks designed to achieve a larger task or goal. The workflow tasks may consist of a series of batch jobs, Time Sharing Option (TSO) command lists, Interactive System Productivity Facility (ISPF) command lists, mainframe executable commands, or manual steps requiring human intervention.

The method and system provide authorized users a framework to create repeatable mainframe workflows around existing mainframe processes, and to enhance processes to leverage the strengths of this framework. The method and system may also provide the capability to create and execute mainframe workflows for performing change deployment to multiple destinations from a single focal point. A user may be able to create task dependencies between workflow tasks executing on different system environments. Embodiments of the invention provide a live web dashboard for monitoring and controlling workflow tasks associated with a mainframe workflow, even across multiple deployment destinations. A user may be able to view output results of all workflow tasks from the web dashboard by providing authentication information. A user may also be able to resubmit individual mainframe workflow tasks for execution from the web dashboard.

Figure 1A:
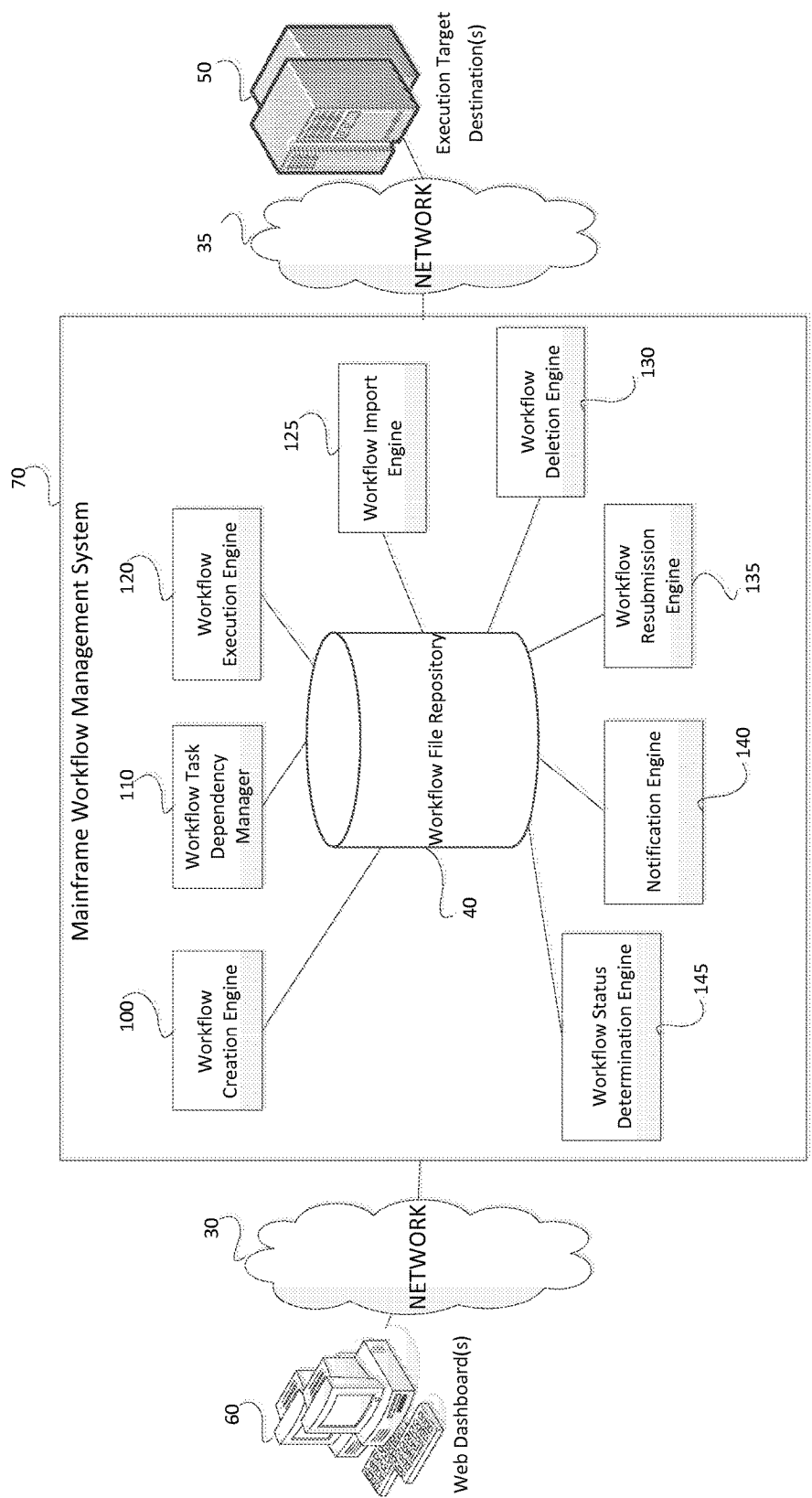
FIG. 1A is a block diagram illustrating an operating environment for a Mainframe Workflow Management System in accordance with an embodiment of the invention.

FIG. 1A is a block diagram illustrating an operating environment for a Mainframe Workflow Management System in accordance with an embodiment of the invention. The Mainframe Workflow Management System 70 is connected through a communications medium over a Network 30, such as the internet, an intranet, a local-area-network (LAN), a wide-area-network (WAN), etc., to one or more Web Dashboard(s) 60. The Web Dashboard(s) 60 may allow a user to create workflow(s), execute workflow(s), review and monitor workflow status, and resubmit workflow(s) for execution.

The Mainframe Workflow Management System 70 is also connected through a communications medium over a Network 35, such as the internet, an intranet, a local-area-network (LAN), a wide-area-network (WAN), etc., to one or more Execution Target Destination(s) 50. In an embodiment of the invention, the Execution Target Destination(s) 50 is a mainframe. The Mainframe Workflow Management System 70 may submit one or more workflow tasks for execution at one or more Execution Target Destination(s) 50.

The Mainframe Workflow Management System 70 includes a Workflow File Repository 40, a Workflow Creation Engine 100, a Workflow Task Dependency Manager 110, a Workflow Execution Engine 120, a Workflow Import Engine 125, a Workflow Deletion Engine 130, a Workflow Resubmission Engine 135, a Notification Engine 140, and a Workflow Status Determination Engine 145. In an embodiment of the invention, the Workflow File Repository 40 may be a database that is local to the Mainframe Workflow Management System 70 and that stores data to be used by the Mainframe Workflow Management System 70 to perform the workflow execution.

A user may access the Web Dashboard 60 using a web browser. In an embodiment of the invention, a user is prompted to provide authentication information before access to the Web Dashboard 60 is granted. Examples of authentication information include, but are not limited to, username, user id, password, biometrics, etc. Once a user is authenticated, he/she may be able to perform several actions using the Web Dashboard(s) 60. For example, a user may be able to create a new workflow, load an existing workflow, save a workflow, create a copy of a workflow, or delete a workflow.

If a user wants to create a new workflow, the Workflow Creation Engine 100 may create a new workflow using one or more parameters specified by the user. Examples of parameters include, but are not limited to, workflow name, workflow file destination path, tasks associated with the workflow, type of workflow, etc. The Workflow Creation Engine 100 may also associate the new workflow with default parameters. For example, if a user creates a new workflow using the Web Dashboard 60, the Workflow Creation Engine 100 may create five workflow tasks by default and associate them with the newly created workflow.

Figure 2:
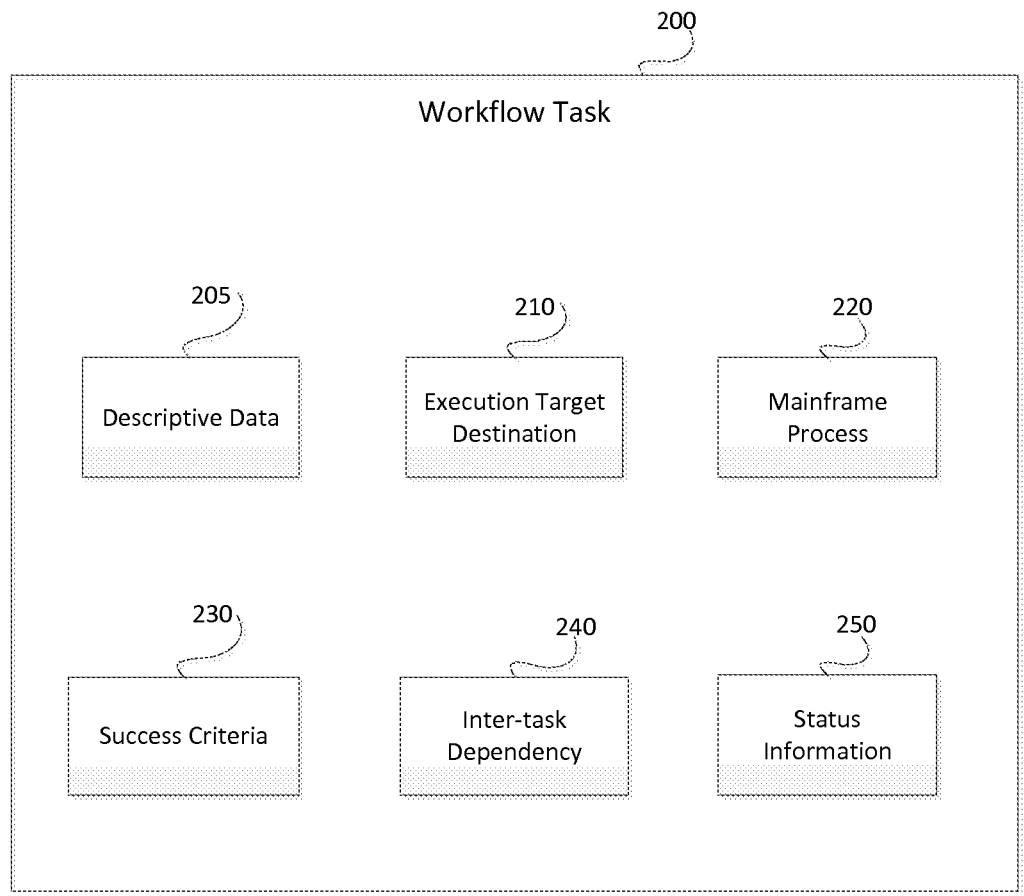
FIG. 2 is a block diagram illustration various components of a Workflow Task in accordance with an embodiment of the invention.

A workflow task may be comprised of several pieces of information, as shown in FIG. 2. A workflow task 200 may be comprised of Descriptive Data 205, Execution Target Destination 210, Mainframe Process 220, Success Criteria 230, Inter-task Dependency 240, and Status Information 250. Descriptive Data 205 may include, but is not limited to the following information: task identifier, description, and invocation method. The Execution Target Destination 210 may include information about the mainframe system(s) where the task may be executed. Different workflow tasks may be associated with different Execution Target Destinations 210.

The Workflow Task 200 may also contain information about the Mainframe Process 220 that defines the mainframe process that may be executed to accomplish the purpose of the Workflow Task 200. For example, the Mainframe Process 220 may be one of the following: batch job, Time Sharing Option (TSO) command list, Interactive System Productivity Facility (ISPF) command list, Restructured Extended Executor (REXX) program, Command Line Interface Formulation Framework (CLIF) program, mainframe executable command, or a manual step requiring human intervention.

The Workflow Task 200 may be associated with the Success Criteria 230 that includes information used to determine if a task execution was successful or not. For example, the Success Criteria 230 may be a completion code that indicates the status of a task. The Workflow Task 200 may also contain one or more inter-task dependencies. In an embodiment of the invention, the Workflow Task Dependency Manager 110 may be used to define one or more inter-task dependencies between one or more workflow tasks. For example, if Task 2 is dependent upon the successful completion of Task 1, then the task identifier of Task 1 may be associated with Task 2 as a dependency using the Workflow Task Dependency Manager 110. The Workflow Task Dependency Manager 110 may allow a user to create a new task dependency, delete a task dependency, or modify a task dependency.

The Workflow Task 200 may also include Status Information 250 of the task. Status Information 250 may be comprised of the task status (initialized, pending, executing completed, failed, etc.), task readiness (reason task is waiting, etc.), task start and end date and time, task completion code, link to view task's output, etc.

The newly created workflow and its associated tasks may then be saved in the Workflow File Repository 40. Once a mainframe workflow has been created, the user may then be able to execute the mainframe workflow using the Workflow Execution Engine 120. The Workflow Execution Engine 120 may execute the one or more workflow tasks associated with the mainframe workflow based on the various workflow task parameters and properties. The Workflow Status Determination Engine 145 may be used to determine the status of the various workflow tasks, and the overall status of the mainframe workflow.

In an embodiment of the invention, the Notification Engine 140 sends a notification to the user regarding the status of the workflow and its associated tasks. The Notification Engine 140 may also send a notification to a user if an error occurs during the execution of the workflow. A user may be able to resubmit a workflow from the Web Dashboard 60. The Workflow Resubmission Engine 135 may manage the execution of the resubmitted workflow. A user may also be able to import a saved workflow using the Workflow Import Engine 125. The user may then execute the imported workflow, modify the imported workflow, or delete the imported workflow. A workflow may be deleted using the Workflow Deletion Engine 130.

Figure 1B:
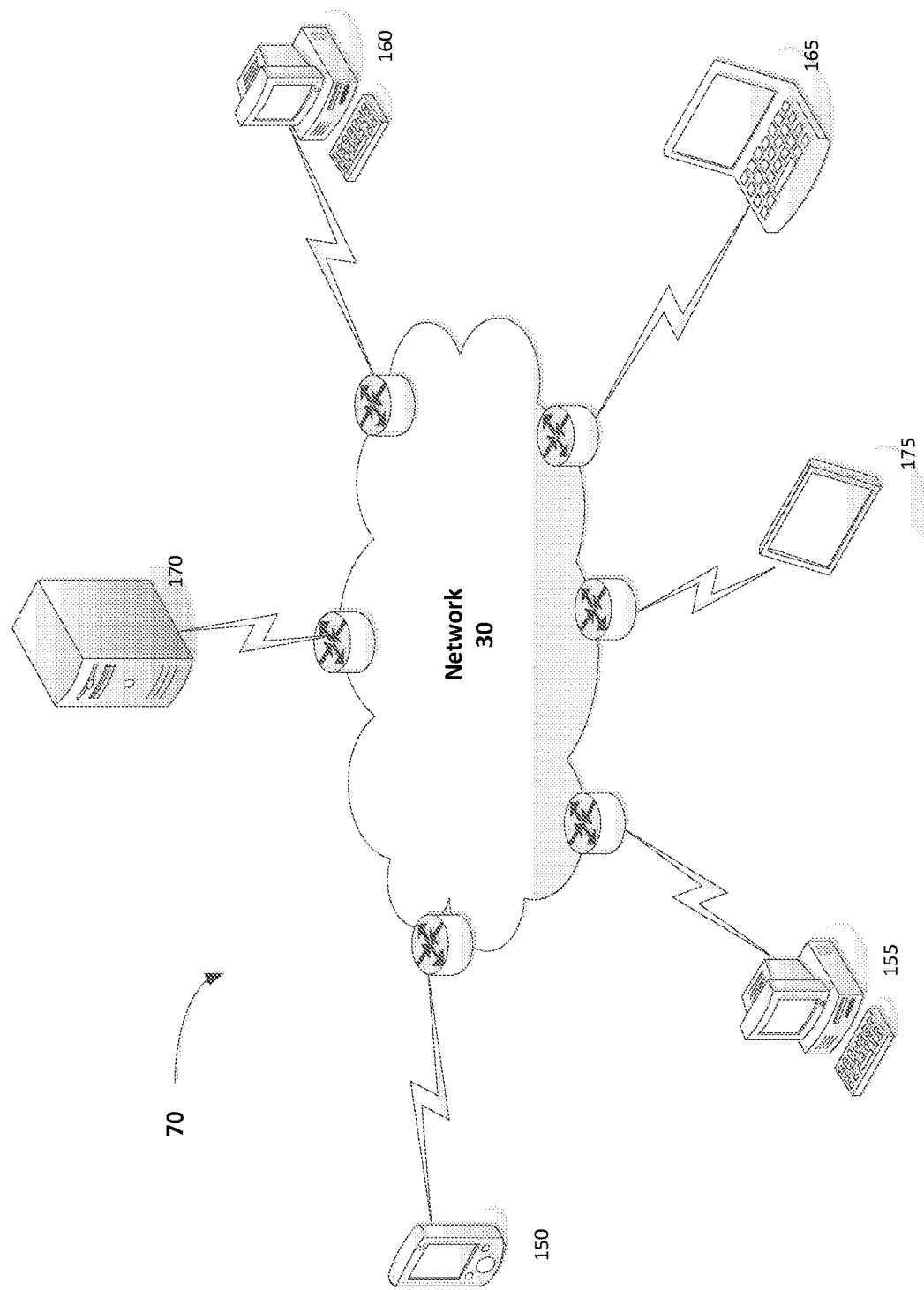
FIG. 1B is a block diagram illustrating an operating environment for a Mainframe Workflow Management System in accordance with an embodiment of the invention.

FIG. 1B is a block diagram illustrating an operating environment for a Mainframe Workflow Management System 70 in accordance with an embodiment of the invention. Those skilled in the art will appreciate that the invention may be practiced with various computer system configurations, including hand-held wireless devices such as mobile phones, smart phones or Personal Digital Assistants (PDAs) 150, multiprocessor systems 155, microprocessor-based or programmable consumer electronics 160, minicomputers 165, mainframe computers 170, Tablets (iPad™, Samsung Galaxy™, etc.) 175, and the like. The invention may also be practiced in distributed computing environments where tasks are performed by remote processing devices that are linked through a communications network. In a distributed computing environment, program modules may be located in both local and remote computer storage media including memory storage devices.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Figure 3:
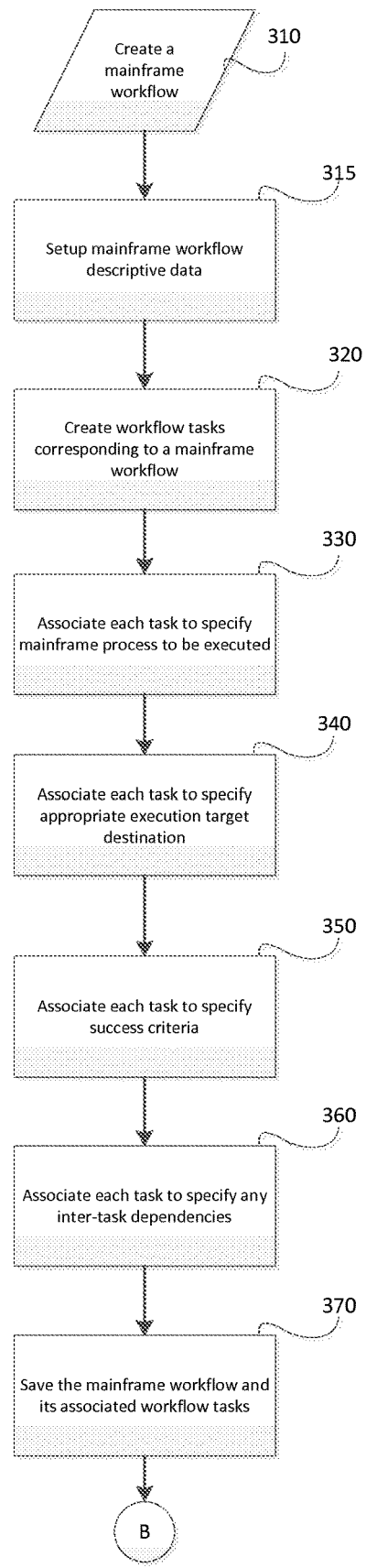
FIG. 3 is a flow chart illustrating a method for creating a Workflow in accordance with an embodiment of the invention.

FIG. 3 is a flow chart illustrating a method for creating a mainframe workflow. The method begins by creating a mainframe workflow at 310. The method may first setup mainframe workflow descriptive data at 315. Examples of mainframe descriptive data include, but are not limited to, workflow name, file path for storage, user access permission rules, etc. The method may then create, at 320, one or more workflow tasks corresponding to the mainframe workflow. In an embodiment of the invention, the method may automatically create five workflow tasks by default. The method may also assign default values to the workflow tasks. The default values may be assigned based on past actions taken by the user, user preferences, system default values, etc. In an embodiment of the invention, the method may associate each workflow task, at 330, with a corresponding mainframe process that may be executed to perform the task. A mainframe process may be a series of instructions that may be executed on a mainframe to perform the workflow task. For example, a mainframe process may be a batch job, a TSO command list, an ISPF command list, a REXX program, a CLIF program, a mainframe executable command, or a manual step requiring human intervention.

The method may associate each workflow task, at 340, with one or more execution target destinations. An execution target destination may be a mainframe on which the mainframe process associated with the workflow task is executed. Different execution target destinations may be associated with different tasks such that the workflow tasks associated with a mainframe workflow may be executed on different mainframes. The method may also associate each workflow task, at 350, with a success criteria. A success criteria may be a program code that is generated by the mainframe process associated with the workflow task. The success criteria may be used by the method to determine whether the workflow task was executed successfully. The method may also associate each task, at 360, with one or more inter-task dependencies. For example, a task, Task 1, may be dependent on the successful execution of another task, Task 2, such that the execution of Task 1 may not be started until Task 2 is successfully executed. In such a case, Task 1 will be associated with an inter-task dependency that specifies that it is dependent upon the successful execution of Task 2. After a mainframe workflow is created and all the data associated with the mainframe workflow is populated, including workflow tasks and their associated data, the method may save the mainframe workflow and its associated workflow tasks at 370.

Figure 4:
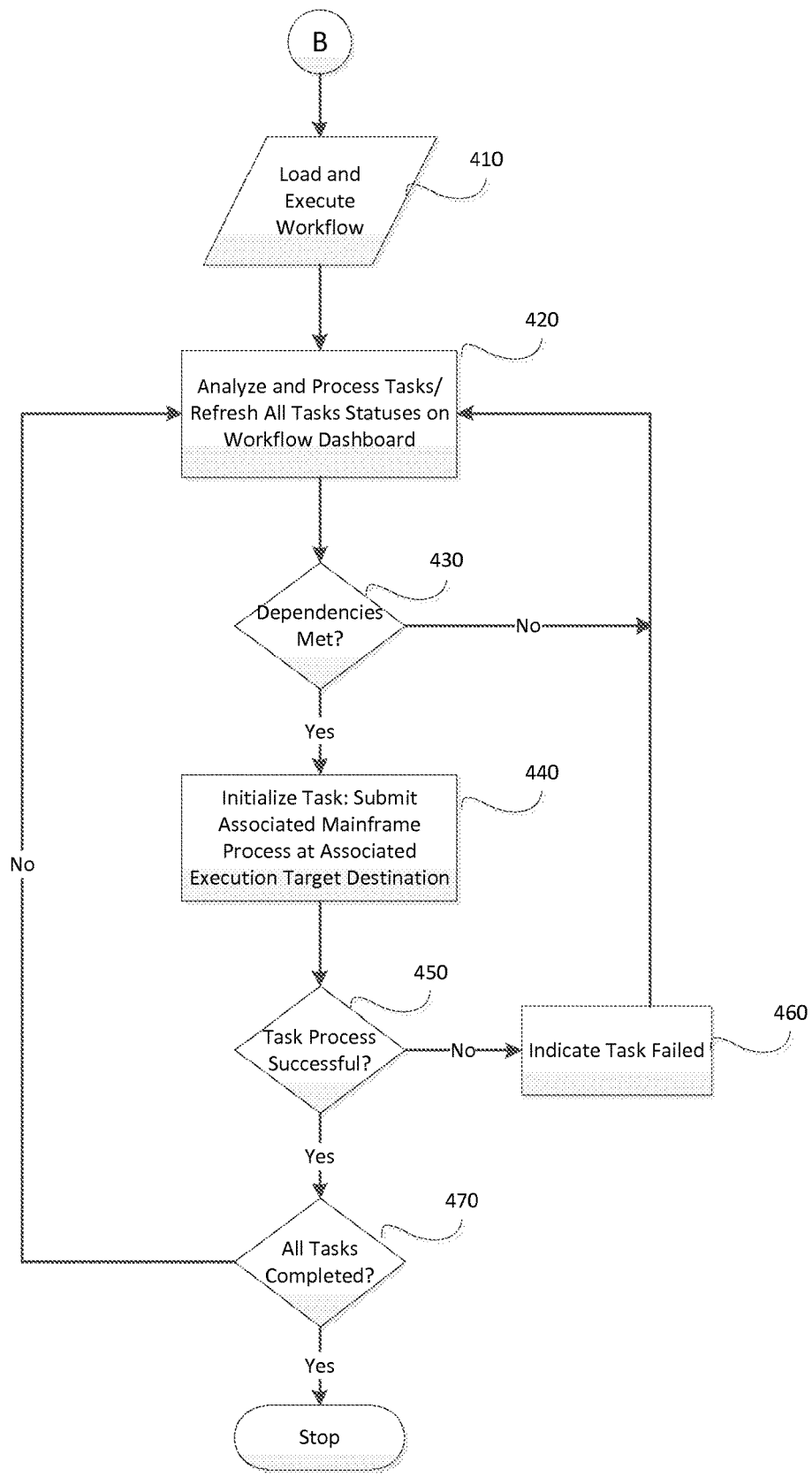
FIG. 4 is a flow chart illustrating a method for executing a Workflow in accordance with an embodiment of the invention.

FIG. 4 is a flow chart illustrating a method for executing a mainframe workflow. The method begins by loading a mainframe workflow at 410. A previously saved mainframe workflow may be loaded from the Workflow File Repository 40 (FIG. 1A). In an embodiment of the invention, a mainframe workflow may be imported using the Workflow Import Engine 125 (FIG. 1A). At 420, the method may then analyze and process the workflow tasks associated with the mainframe workflow. The method may provide the ability to review the source of a workflow task for each workflow task before it is executed. An example of a user interface displaying the source for a workflow task is described in greater detail in reference with FIG. 8. The method may then check, at 430, whether the inter-task dependencies associated with one or more workflow tasks have been met. If a dependency associated with a workflow task is not met, the method may return to step 420 and continue to analyze and process the tasks until all the inter-task dependencies associated with one or more workflow tasks are met. If all the inter-task dependencies associated with the workflow tasks are met, the method may then, at 440, initialize the workflow task for execution. The method may submit a mainframe process for execution at the execution target destination associated with the workflow task. The method may provide the ability to review the source of a workflow task for each workflow task after it is executed. An example of a user interface displaying the source for a workflow task is described in greater detail in reference with FIG. 8. The method may then determine, at 450, whether the task execution was successful. For example, the method may compare the program code that is generated by the mainframe process associated with the workflow task with the success criteria associated with the workflow task to determine if there is a match. If the mainframe task process is not successful, the method may indicate, at 460, that the task process failed. The method may then return to step 420 and the process for executing the workflow task may be repeated. However, if the task process is successful, the method, at 470, determines if all the workflow tasks associated with the mainframe workflow are completed. If all the workflow tasks associated with the mainframe workflow are completed, the method may end. On the other hand, if all the workflow tasks associated with the mainframe workflow are not completed, the method may return to step 420 and the process for executing the workflow task may be repeated.

Figure 5A:
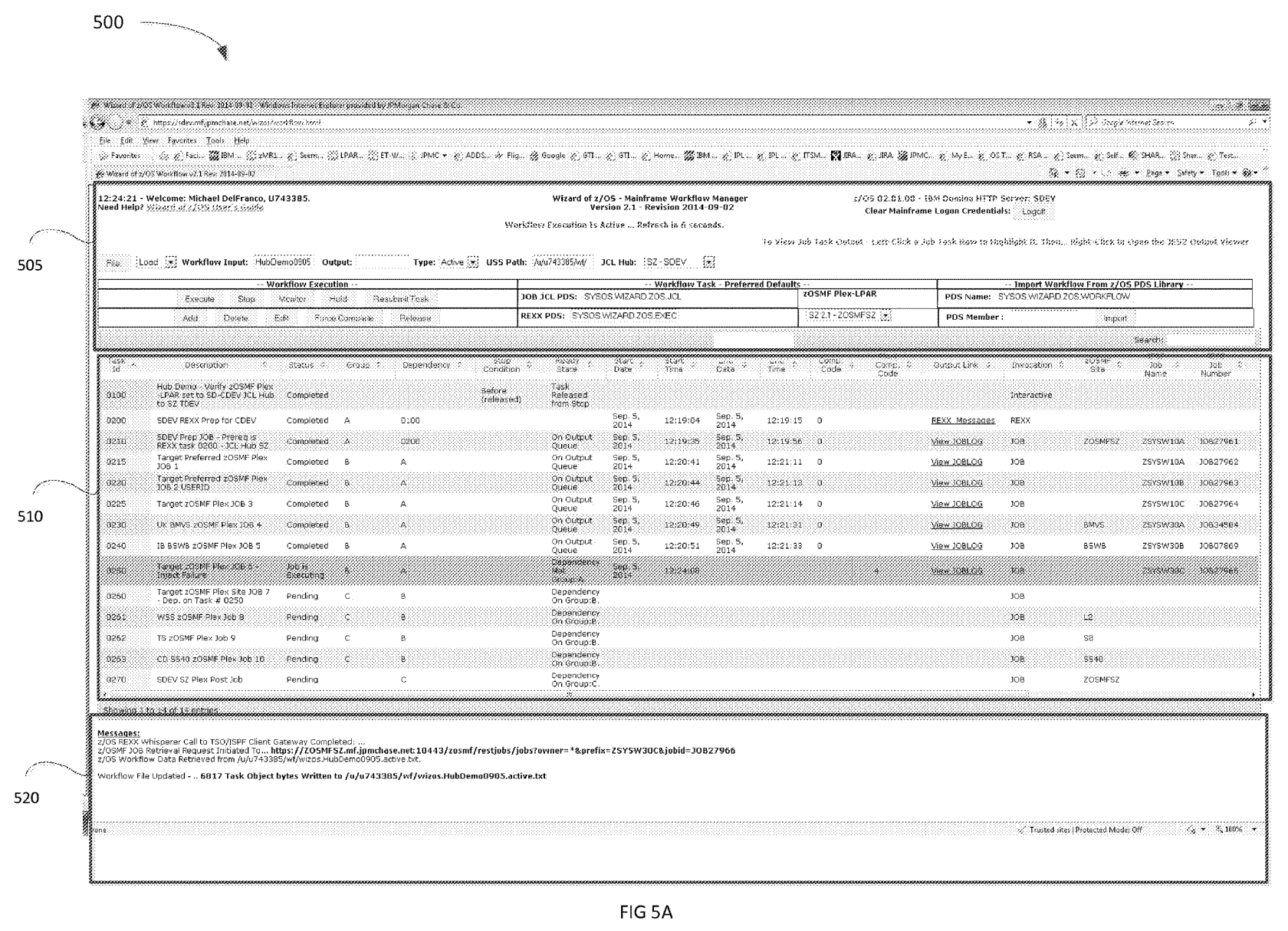

FIG. 5A is a user interface illustrating a section of the Web Dashboard of a Mainframe Workflow Management System in accordance with an embodiment of the invention. The Web Dashboard 500 may allow a user to interact with the Mainframe Workflow Management System. In an embodiment of the invention, the Web Dashboard 500 may be comprised of three sections: the Mainframe Workflow Information and Actions section 505, the Workflow Tasks section 510, and the Messages section 520. The Mainframe Workflow Information and Actions section 505 may display information about the Mainframe Workflow. It may also allow a user to perform various actions associated with a Mainframe Workflow and Workflow tasks. The Mainframe Workflow Information and Actions section 505 is described in greater detail in reference with FIG. 5B. The Web Dashboard 500 may also be comprised of a Workflow Tasks section 510. The Workflow Tasks section 510 may display the Workflow Tasks associated with a Mainframe Workflow, including several properties of the Workflow Tasks. The Workflow Tasks section 510 is described in greater detail in reference with FIG. 6. The Web Dashboard 500 may also comprise of a Messages section 520. The Messages section 520 may display various messages generated during the creation, execution, or management of the Mainframe Workflow. The Messages section 520 is described in greater detail in reference with FIG. 5C.

Figures 5B, 5C:
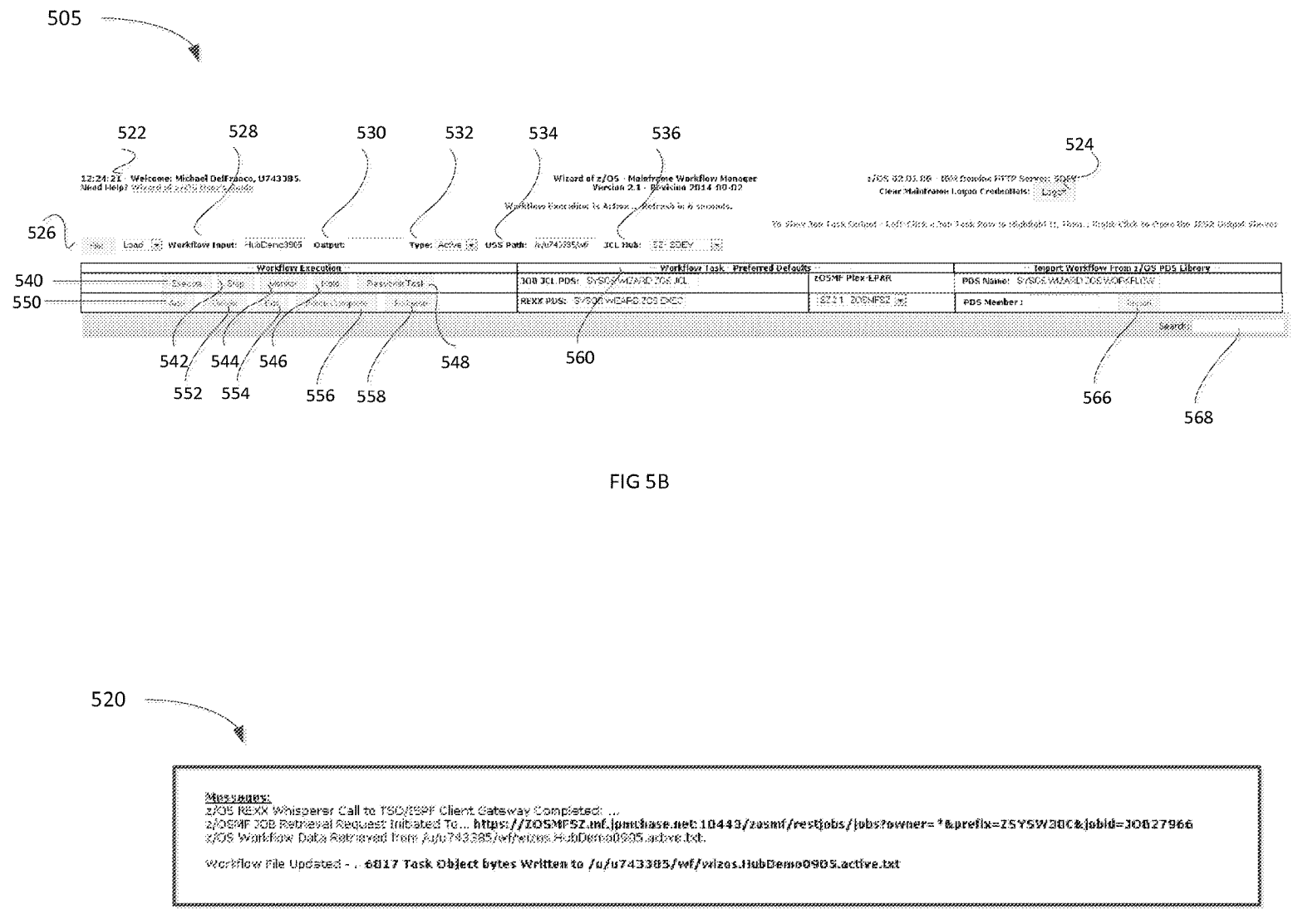

FIG. 5B is a user interface illustrating a Web Dashboard of a Mainframe Workflow Management System in accordance with an embodiment of the invention. Specifically, FIG. 5B illustrates the key elements of Mainframe Workflow Information and Actions section 505. The Mainframe Workflow Information and Actions section 505 may display the user information 522, such as user name, ID, and date/time of last login. The Mainframe Workflow Information and Actions section 505 may allow a user to logout of the Mainframe Workflow Management System using a Logout button 524. The Mainframe Workflow Information and Actions section 505 may allow a user to perform various functions related to a Mainframe Workflow using a File control 526. For example, in an embodiment of the invention, a user may be able to perform the following functions using the File control 526: load a stored or archived Mainframe Workflow named in a Workflow Input field 528, save a Mainframe Workflow named in an Output field 530, create a new Mainframe Workflow named in the Output field 530, or delete a Mainframe Workflow named in the Output field 530. The Mainframe Workflow Information and Actions section 505 may allow a user to select the Mainframe Workflow file type using a Type field 532. The Mainframe Workflow Information and Actions section 505 may further allow a user to specify the file path of the Mainframe Workflow in the Workflow File Repository 40 (not pictured) using a USS Path field 534. If a value is not specified in the USS Path field 534, a default value may be used. The Mainframe Workflow Information and Actions section 505 may further comprise of a JCL Hub field 536. A Job JCL Hub is an option which allows the owner of a workflow to designate a single Mainframe Sysplex to be the origin for all JCL (Job Control Language) used in their workflow. The Job JCL Hub field 536 may allow a workflow owner to maintain a single set of JCL which can be used across many implementation points. In an embodiment of the invention, if the Job JCL Hub field 536 is not specified (e.g., None), the source of the JCL may be the same as the sysplex target where the task's job will be executed.

The Mainframe Workflow Information and Actions section 505 may further allow a user to execute several actions related to a Mainframe Workflow, including, but not limited to: execute a workflow, stop a workflow execution, monitor a workflow execution, hold a workflow task, resubmit a workflow task, add a workflow task, delete a workflow task, edit a workflow task, force complete a workflow task, and release a workflow task. A user may initiate workflow execution using an Execute button 540. A user may stop workflow execution using a Stop button 542. A user may monitor workflow execution using a Monitor button 544. A user may perform individual task control using a Release button 558, a Hold button 546, a Resubmit Task button 548, and a Force Complete button 556. One or more workflow tasks may be modified using an Add button 550 (to add a workflow task to a mainframe workflow), a Delete button 552 (to delete a workflow task from a mainframe workflow), and an Edit button 554.

Figure 7:
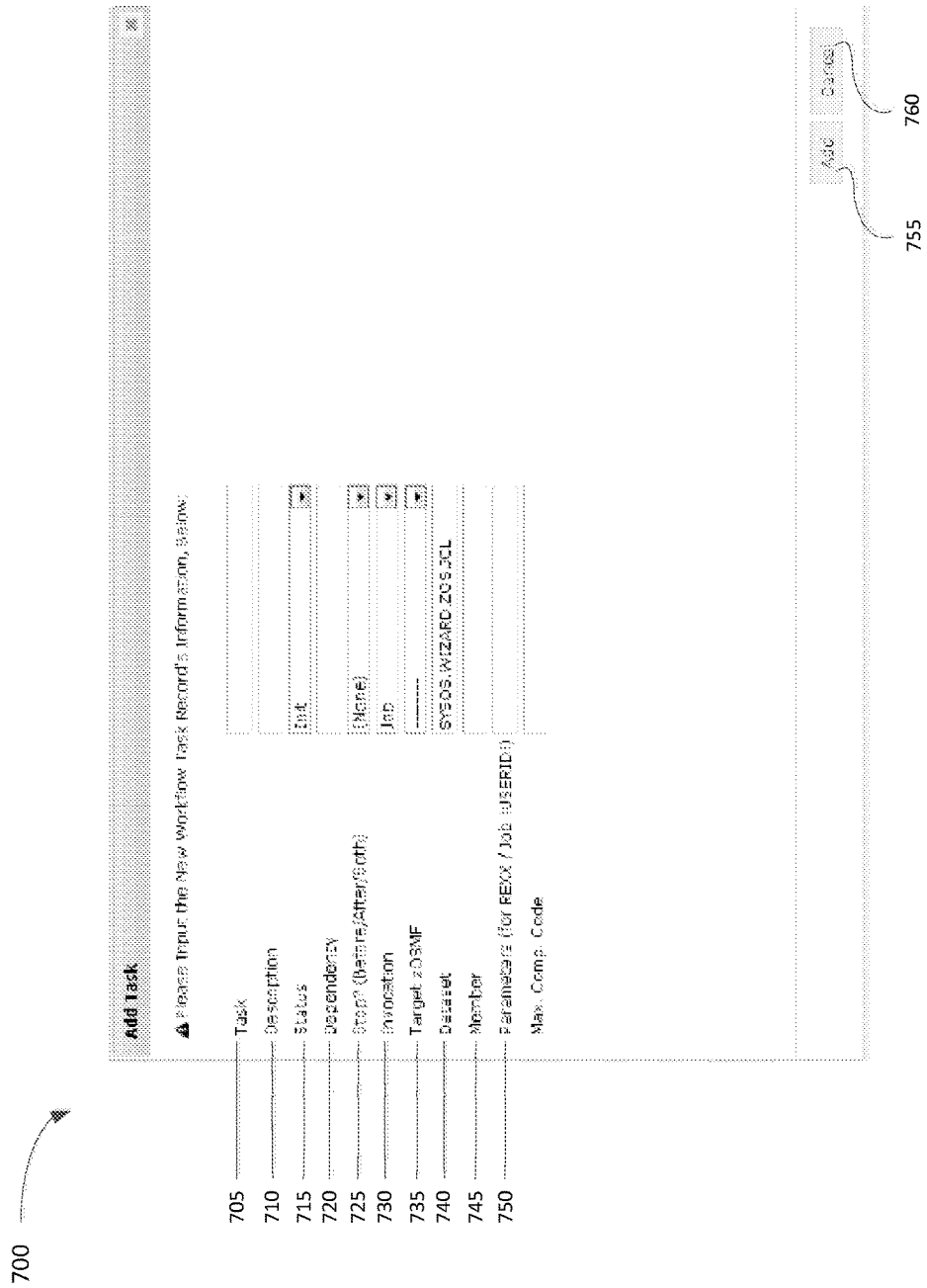
FIG. 7 is a user interface illustrating an Add Task user interface of a Mainframe Workflow Management System in accordance with an embodiment of the invention.

The Add button 550 may allow a user to add a workflow task by specifying one or more parameters associated with a workflow task. FIG. 7 illustrates an Add Task user interface 700 that may be invoked when the Add button 550 is selected. The Add Task user interface 700 may allow a user to specify one or more parameters associated with a workflow task including, but not limited to, Name 705, Description 710, Status 715, Dependency 720, Invocation Type 730, Execution Target 735, Dataset 740, Member 745, and other workflow task parameters 750. The Description 710 may be a free-form description of the workflow task. In an embodiment of the invention, the Status 715 may be one of the following values: initiate, failed, pending, or held. The Invocation Type 730 may be the invocation method of the workflow task. In an embodiment of the invention, the Invocation Type 730 may be one of the following values: a batch job, a TSO command list, an ISPF command list, a REXX program, a CLIF program, a mainframe executable command, or a manual step requiring human intervention. The Execution Target 735 may be the identifier of a specific target destination where the workflow task may execute. The Dataset 740 may the identifier of the dataset that contains the workflow task's Job Control Language (JCL). The Member 745 may be the member identifier of the Dataset 740 containing the source of the workflow task's JCL. The Add Task user interface 700 may also allow a user to specify stop conditions 725 for a workflow task. For example, a user may be able to specify that the workflow task will not be invoked until it is released via the Release button 558 on the Mainframe Workflow Information and Actions section 505 (not pictured). Alternatively, a user may specify that the workflow task will not be considered 'Complete' until it is released via the Release button 558 on the Mainframe Workflow Information and Actions section 505 (not pictured). After specifying one or more workflow task parameters, a user may add the workflow task using the Add button 755. Alternatively, a user may cancel the operation using the Cancel button 760.

A user may further specify workflow task preferences using one or more Preferred Defaults fields 560. For example, a user may be able to specify a default execution site for a workflow task. The Mainframe Workflow Information and Actions section 505 may also allow a user to import a previously saved Mainframe Workflow using the Import section 566. A user may be able to browse for a Mainframe Workflow, and select it for import. A user may further be able to search for a Mainframe Workflow and/or its associated tasks using the Search feature 568.

FIG. 5C is a user interface illustrating a Web Dashboard of a Mainframe Workflow Management System in accordance with an embodiment of the invention. Specifically, FIG. 5C illustrates the key elements of a Messages section 520 of the Mainframe Web Dashboard.

FIG. 6 is a user interface illustrating a section of the Web Dashboard of a Mainframe Workflow Management System in accordance with an embodiment of the invention. Specifically, FIG. 6 illustrates the key elements of the Workflow Tasks section 510. The Workflow Tasks section 510 may display all the workflow tasks associated with a mainframe workflow. The Workflow Tasks section 510 may display the following details about a workflow task: task identifier 605, description 610, status 615, dependency 620, ready state 625, start date/time 630, end date/time 635, results 640, type 645, execution target destination 650, and job JCL 655. For example, row 660 displays a workflow task with task identifier 605 '0100,' a description 610 'Deploy XYZ on SYSPLEX "A," and type 645 'Job.' The status 615 of the task is 'Completed,' it does not have any dependencies as indicated by dependency 620 'None,' and its ready state 625 is 'On Output Queue.' Further, the Workflow Tasks section 510 displays the start date/time 630 and end date/time 635 of workflow task identifier '0100.' The Workflow Tasks section 510 also displays that the task result 640 was 'Success' on the execution target destination 650 'Sysplex "A".' The Workflow Tasks section 510 also displays details about the workflow task's Job JCL 655, that is, identifier of the dataset that contains the workflow task's JCL, and the associated member identifier. Similarly, row 665 displays a workflow task with task identifier 605 '0500,' a description 610 'Validate XYZ on SYSPLEX "A," and type 645 'Job.' The status 615 of the task is 'Completed,' it is dependent upon task '0100' (row 660) as indicated by dependency 620 '0100,' and its ready state 625 is 'On Output Queue.' Further, the Workflow Tasks section 510 displays the start date/time 630 and end date/time 635 of workflow task identifier '0500.' The Workflow Tasks section 510 also displays that the task result 640 was 'Success' on the execution target destination 650 'Sysplex "A".' Row 670 displays a workflow task with task identifier 605 '0700,' a description 610 'Validate XYZ on SYSPLEX "C." and type 645 'Job.' The status 615 of the task is 'Job is Executing,' it is dependent upon task '0300' as indicated by dependency 620 '0300,' and its ready state 625 is 'Dependency on 0300 Met.' Further, the Workflow Tasks section 510 displays the start date/time 630 of workflow task identifier '0700.' Since the task is still executing, as indicated by status 615, the end date/time 635 and task result 640 are empty. Row 675 displays a workflow task that is still pending because it is dependent upon a task that has not completed yet. Row 675 displays a workflow task with task identifier 605 '0800,' a description 610 'Validate XYZ on SYSPLEX "D," and type 645 'Job.' The status 615 of the task is 'Pending' because it is dependent upon task '0400' that is yet to complete execution. The ready state 625 for task '0800' is 'Dependency Wait on 0400.' Further, since the task has yet to begin execution, the start date/time 630, end date/time 635, and the task result 640 are empty.

Figure 8:
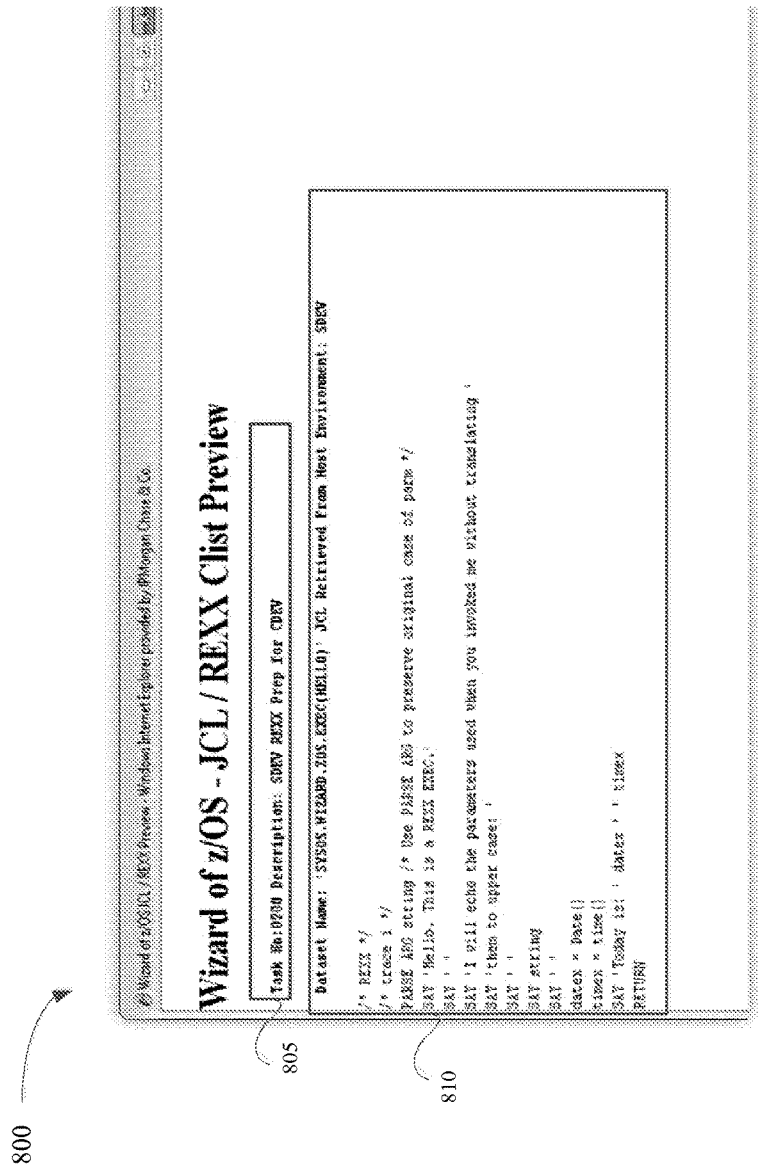
FIG. 8 is a user interface illustrating a Workflow Task Source View user interface of a Mainframe Workflow Management System in accordance with an embodiment of the invention.

FIG. 8 is a user interface illustrating a Workflow Task Source View user interface of a Mainframe Workflow Management System in accordance with an embodiment of the invention. The Workflow Task Source View user interface 800 may display details about a task 805, such as task number, task description, and dataset name. The Workflow Task Source View user interface 800 may also display the source code 810 of the workflow task. For example, the source code 810 of a workflow task may be the list of REXX commands that may be executed to perform the workflow task.

As described above, embodiments of the system of the invention and various processes of embodiments are described. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A mainframe workflow creation method for creating and managing workflow tasks in a mainframe workflow management system, the method system comprising:
    activating a workflow creation engine in the mainframe workflow management system by a user of a computing device using a web dashboard,
        wherein the user must be authenticated using authentication information, including biometric information of the user, prior to being granted access to the web dashboard, and upon authentication, the user is authorized to access the web dashboard to execute operations including creating a new workflow, loading and modifying an existing workflow, saving a workflow, deleting a workflow, and specifying stop conditions for a workflow task;
    communicating with the mainframe workflow management system using the web dashboard over a first communication network;
    creating, by a processor in the mainframe workflow management system using the mainframe workflow creation engine, one or more workflow tasks corresponding to a mainframe workflow composed of a plurality of workflow tasks;
    associating, by the processor using the mainframe workflow creation engine, the one or more workflow tasks with a mainframe workflow process composed of a plurality of workflow tasks;
    selecting a target mainframe computing system from a plurality of target mainframe computing systems for execution of the mainframe workflow process composed of the plurality of workflow tasks;
    transmitting the mainframe workflow process composed of the plurality of workflow tasks to the selected target mainframe computing system over a second communication network; and
    executing the mainframe workflow process, including plurality of workflow tasks, by the selected target mainframe computing system,
    wherein each workflow task includes a completion code that indicates a status of a completed task,
    wherein each workflow task is also associated with a program code generated by the mainframe workflow process, which is compared to the completion code in the workflow task to determine whether the workflow task was successfully executed,
    wherein upon creation of a new workflow by the Web Dashboard based on specified parameters, the workflow creation engine automatically creates one or more workflow tasks by default upon creation to the mainframe workflow, which are assigned default values based on past actions taken by the user, and
    wherein a fixed predetermined number of default workflow tasks are automatically created based on the new workflow created by the user via the web dashboard,
        (i) with at least one of the fixed predetermined number of default workflow tasks being automatically assigned a default value based on past actions taken by the user,
        (ii) with at least one of the fixed predetermined number of default workflow tasks being automatically assigned a default value based on preferences previously set by the user, and
        (iii) with at least one of the fixed predetermined number of default workflow tasks being automatically assigned based on mainframe workflow management system default values.

2. The mainframe workflow creation method according to claim 1, further comprising:
    storing the mainframe workflow process, including plurality of workflow tasks, in a workflow file repository at the mainframe workflow management system.

3. The mainframe workflow creation method according to claim 1,
    wherein the user of the computing device using the web dashboard can monitor a status of a selected workflow task.

4. The mainframe workflow creation method according to claim 1,
    wherein selected task of the one or more tasks are associated with a plurality of mainframe workflow processes.

5. The mainframe workflow creation method according to claim 1,
wherein the mainframe workflow management system includes a workflow status determination engine that determines the status of the execution of each of the plurality of workflow tasks.

6. The mainframe workflow creation method according to claim 1,
wherein the mainframe workflow management system includes a workflow resubmission engine that selectively resubmits workflow tasks for execution based on instructions received by the mainframe workflow management system from the web dashboard.

7. The mainframe workflow creation method according to claim 6,
wherein the workflow resubmission engine resubmits a workflow task for execution when at least one inter-task dependency between workflow tasks is not met.

8. The mainframe workflow creation method according to claim 1,
wherein the mainframe workflow management system includes a workflow task dependency manager for creating global inter-task dependencies between different workflow tasks of the plurality of workflow tasks.

9. The mainframe workflow creation method according to claim 1,
wherein the first communication network and the second communication network are the same communication network.

10. The mainframe workflow creation method according to claim 1,
wherein the first communication network and the second communication network are different communication networks.

11. The mainframe workflow creation method according to claim 8,
wherein the workflow task dependency manager also selectively modifies and/or deletes dependencies between different workflow tasks of the plurality of workflow tasks.

12. The mainframe workflow creation method according to claim 1,
wherein the mainframe workflow management system includes a notification engine that sends a notification when an error occurs during execution of the workflow process.

13. A non-transitory computer readable storage medium that includes a computer program, which when executed by a processor, performs operations for creating and managing workflow tasks in a mainframe workflow management system, comprising:
activating a workflow creation engine in the mainframe workflow management system by a user of a computing device using a web dashboard,
wherein the user must be authenticated using authentication information, including biometric information of the user, prior to being granted access to the web dashboard, and upon authentication, the user is authorized to access the web dashboard to execute operations including creating a new workflow, loading and modifying an existing workflow, saving a workflow, deleting a workflow, and specifying stop conditions for a workflow task;
communicating with the mainframe workflow management system using the web dashboard over a first communication network;
creating, by a processor in the mainframe workflow management system using the mainframe workflow creation engine, one or more workflow tasks corresponding to a mainframe workflow composed of a plurality of workflow tasks;
associating, by the processor using the mainframe workflow creation engine, the one or more workflow tasks with a mainframe workflow process composed of a plurality of workflow tasks;
selecting a target mainframe computing system from a plurality of target mainframe computing systems for execution of the mainframe workflow process composed of the plurality of workflow tasks;
transmitting the mainframe workflow process composed of the plurality of workflow tasks to the selected target mainframe computing system over a second communication network; and
executing the mainframe workflow process, including plurality of workflow tasks, by the selected target mainframe computing system,
wherein each workflow task includes a completion code that indicates a status of a completed task,
wherein each workflow task is also associated with a program code generated by the mainframe workflow process, which is compared to the completion code in the workflow task to determine whether the workflow task was successfully executed,
wherein upon creation of a new workflow by the Web Dashboard based on specified parameters, the workflow creation engine automatically creates one or more workflow tasks by default upon creation to the mainframe workflow, which are assigned default values based on past actions taken by the user, and
wherein a fixed predetermined number of default workflow tasks are automatically created based on the new workflow created by the user via the web dashboard,
(i) with at least one of the fixed predetermined number of default workflow tasks being automatically assigned a default value based on past actions taken by the user,
(ii) with at least one of the fixed predetermined number of default workflow tasks being automatically assigned a default value based on preferences previously set by the user, and
(iii) with at least one of the fixed predetermined number of default workflow tasks being automatically assigned based on mainframe workflow management system default values.

14. A mainframe workflow management system for creating and managing workflow tasks, the system comprising:
a processor;
a memory; and
a transmitter/receiver that transmits and receives communications over a communication network to a computing device and to a mainframe computing system,
the processor of the mainframe workflow management system performing operations, including
activating a workflow creation engine in the mainframe workflow management system by a user of the computing device using a web dashboard,
wherein the user must be authenticated using authentication information, including biometric information of the user, prior to being granted access to the web dashboard, and upon authentication, the user is authorized to access the web dashboard to execute operations including creating a new workflow, loading and modifying an existing workflow, saving a workflow, deleting a workflow, and specifying stop conditions for a workflow task;

communicating with the mainframe workflow management system using the web dashboard over the communication network;

creating, using the mainframe workflow creation engine, one or more workflow tasks corresponding to a mainframe workflow composed of a plurality of workflow tasks;

associating the one or more workflow tasks with a mainframe workflow process composed of a plurality of workflow tasks;

selecting a target mainframe computing system from a plurality of target mainframe computing systems for execution of the mainframe workflow process composed of the plurality of workflow tasks;

transmitting the mainframe workflow process composed of the plurality of workflow tasks to the selected target mainframe computing system over the communication network; and executing the mainframe workflow process, including plurality of workflow tasks, by the selected target mainframe computing system, wherein each workflow task includes a completion code that indicates a status of a completed task, wherein each workflow task is also associated with a program code generated by the mainframe workflow process, which is compared to the completion code in the workflow task to determine whether the workflow task was successfully executed, and wherein a fixed predetermined number of default workflow tasks are automatically created based on the new workflow created by the user via the web dashboard,
(i) with at least one of the fixed predetermined number of default workflow tasks being automatically assigned a default value based on past actions taken by the user,
(ii) with at least one of the fixed predetermined number of default workflow tasks being automatically assigned a default value based on preferences previously set by the user, and
(iii) with at least one of the fixed predetermined number of default workflow tasks being automatically assigned based on mainframe workflow management system default values.

15. The mainframe workflow creation method according to claim 1,
wherein the fixed predetermined number of default workflow tasks that are automatically created based on the new workflow is five.

16. The non-transitory computer readable storage medium according to claim 13,
wherein the fixed predetermined number of default workflow tasks that are automatically created based on the new workflow is five.

17. The mainframe workflow management system according to claim 14,
wherein the fixed predetermined number of default workflow tasks that are automatically created based on the new workflow is five.

* * * * *